Jan. 3, 1967  J. MARX  3,295,370

FLUID METERING DEVICE

Filed Aug. 8, 1962

INVENTOR
JOSEF MARX
BY
Burgess, Dinklage + Sprung
ATTORNEYS.

3,295,370
FLUID METERING DEVICE
Josef Marx, Mainz-Kastel, Germany, assignor to Elster & Co. Aktiengesellschaft, Mainz-Kastel, Germany, a corporation of Germany
Filed Aug. 8, 1962, Ser. No. 218,199
2 Claims. (Cl. 73—231)

The present invention relates to a magnetic coupling for the transmission of rotary movement from one chamber to another or into free space, without the use of stuffing boxes, in particular for the use in measuring instruments.

The usual magnetic couplings, whether they are frontal or central couplings, have the disadvantage of a large energy consumption. With frontal couplings, axial forces are produced which are to be taken up by the bearing, causing frictional power loss. With central couplings, lateral bearing forces occur which cannot be avoided because of the unequal magnetisation of the separate magnetic pole pieces.

These undersirable forces are particularly disturbing when the couplings are employed with measuring apparatus, e.g. gas meters, water meters or the like, in which only a relatively small impulse is available in the lower part of the measuring range, because of the small rate of flow of medium to be measured. In order to provide such meters with sufficient measuring accuracy even in this part of the measuring range, it has been necessary hitherto with water meters having their counting mechanism and indicators operating separately from the measuring liquid, to let rotate separate reduction wheels within the medium to be measured. This has an even greater disadvantage because corrosion effects cannot be avoided.

The fact that known magnetic couplings use only the attractive force between oppositely facing N and S pole pieces accounts for the previously mentioned disturbing forces. Because of this, the couplings have their maximum transmissible moment in the unloaded state, namely in the rest position of the apparatus provided therewith, which moment is not necessary at all in this position or upon starting up.

The present invention provides a new form of magnetic coupling in which the disadvantages of the prior devices are avoided by a single step. It is equally realizable as a frontal rotary coupling or as a central rotary coupling and can also be used for the transmission of extremely small impulses, because no frictional power loss is produced by the magnetic forces. The mounting of reduction wheels in front of the coupling within the medium to be measured is no longer necessary and it is possible to provide a considerable constructional simplification of the measuring apparatus, because now the input drive member of the coupling can be readily mounted directly on the shaft of the measuring mechanism.

The invention is based on the fact that the magnets on the input and output sides of the coupling are so arranged that at any time only like poles face one another. With this construction, in which only repelling magnetic forces are used, the novelty lies in the fact that only the smallest moment transmissible by the coupling is effective when the drive is at rest namely when the coupling is unloaded, whereas when loaded the moment becomes greater instantaneously and adapts itself positively and by necessity to the prevailing degree of loading.

Thus, for zero fluid flow, the input or driver magnet and the output or follower magnet are disposed in an equilibrium position with a maximum angular distance between their poles and with the repulsion force at the minimum. For a finite fluid flow, the measuring mechanism shaft and driver magnet will rotate, and this rotation will be transmitted to the follower magnet and the relative angular distance between the driver and follower magnet poles will decrease with increasing torque.

In order that the invention may be more readily understood, preferred embodiments thereof are described below in connection with a water meter with a dry running counting mechanism, in conjunction with the accompanying drawing in which.

Figure 1:
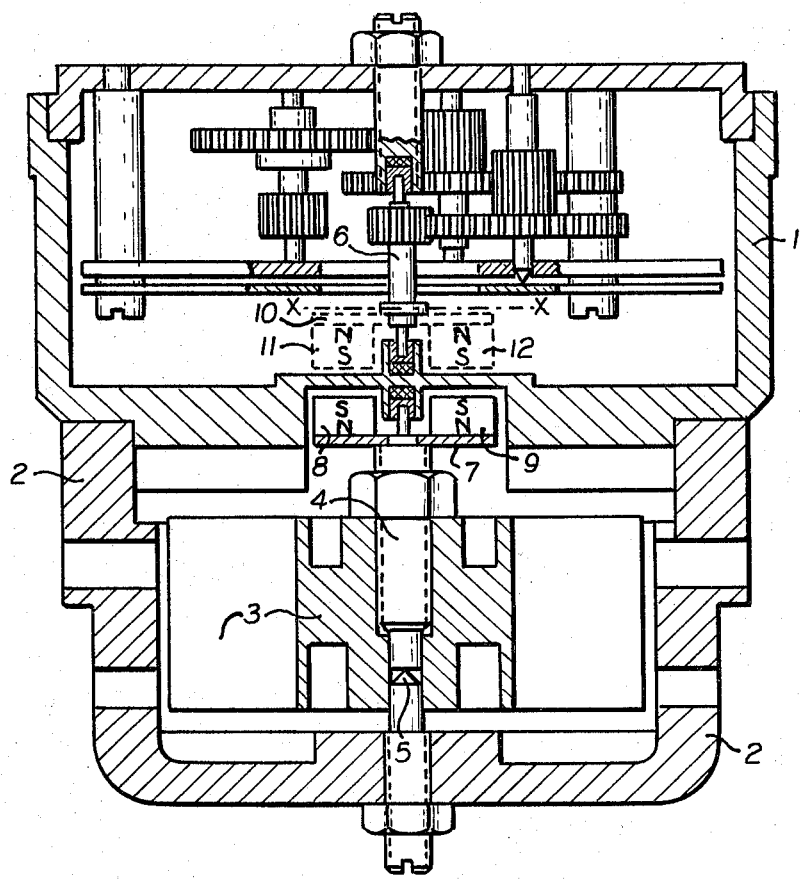
FIG. 1 is a vertical section through the centre of one embodiment with a frontal rotary coupling.

The housing of the meter consists of an upper part 1 and a lower part 2. The base of the upper housing part 1 forms a partition wall between the two housing parts and is formed in the usual manner as a thin plate in the region of the magnetic coupling. The measuring mechanism is in the lower housing part, and shown here as a worm wheel 3, whose shaft 4 is adjustably supported at 5. The counting mechanism (the construction of which is not part of the invention) is positioned in the upper housing part 1 mounted on a shaft 6. A bearing plate 7 or the like having magnets 8 and 9 mounted thereon seats on the worm wheel shaft 4 and acts as the input part of the magnetic coupling. A bearing plate 10 or the like having magnets 11 and 12 mounted thereon seats on the shaft 6 of the counting mechanism and forms the output part of the coupling, and the arrangement is such that only like poles (for example only S-poles) are mounted facing one another.

Figure 2:
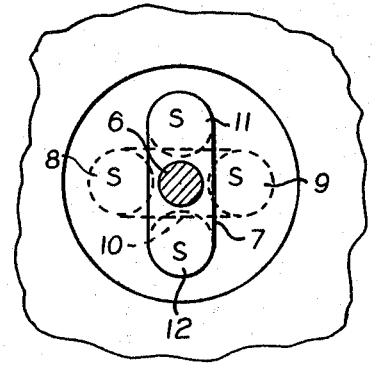
FIG. 2 is a horizontal section along the line X—X of FIG. 1.

Since like poles repel one another, the magnets, having equal strengths and equal distances between their axes in the case shown, take up the position shown in FIG. 2 in the rest position of the measuring apparatus, in which the minimum moment which can be transmitted by the coupling is effective. With the appropriate choice of the magnetic forces, this minimum value will be sufficient to absorb the smallest moment to be transmitted in the lower part of the measuring range. The maximum transmissible value of the moment is reached when the magnets are positioned facing one above the other. On loading the measuring apparatus, the pole pieces approach one another so that the moment transmissible thereby increases. By suitable choice of the magnetic forces and the distances between the axes of the pole pieces, a relatively large moment can be transmitted without prejudice to the sensitivity of the measuring apparatus.

Figure 3:
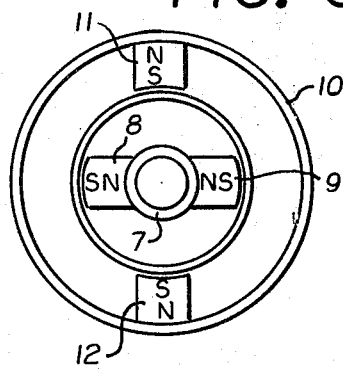
FIG. 3 is a section similar to FIG. 2 through a further embodiment of the invention with a central rotary coupling.

In the embodiment of FIG. 3, the coupling is a central rotary coupling in which bearing rings or the like replace the bearing plates 7 and 10 of FIGS. 1 and 2, the magnets 8 and 9 being mounted on the plate 7 and the magnets 11 and 12 on the plate 10.

The present invention is not limited to the embodiments described but can be modified within the scope of the appended claims, e.g. by choice of different axial distances between the magnets as mentioned above, by the inclusion of means for varying these distances, by the choice of other types of magnets, as dictated by their adaptation to the constructive requirements occurring in practice, by the use of more than the described number of magnets to each side of the coupling, etc.

What I claim is:

1. A fluid metering device comprising a fluid metering chamber having a fluid flow measuring mechanism disposed therein, said mechanism being rotatably mounted on a shaft and having a driver magnet secured thereto, and a counting mechanism rotatably mounted on a shaft externally of said chamber and having a follower magnet associated therewith, in which said magnets are arranged to move in axially aligned annular paths of substantially equal radial dimensions around the common longitudinal axis of said shafts, and in which said magnets have adjacent poles of the same polarity with the individual polar axes of the magnets extending parallel to the common longitudinal axis of said shafts and with said follower magnet being positioned with respect to said driver magnet so as to produce repulsion forces therebetween, such that for zero fluid flow said magnets are disposed in an equilibrium position with a maximum angular distance between their poles and with the repulsion force at a minimum, whereas when a finite fluid flow causes rotation of said measuring mechanism shaft and driver magnet this rotation is transmitted to said follower magnet and the relative angular distance between the magnet poles decreases with increasing torque.

2. A fluid metering device comprising a fluid metering chamber having a fluid flow measuring mechanism disposed therein, said mechanism being rotatably mounted on a shaft and having a driver magnet secured thereto, and a counting mechanism rotatably mounted on a shaft externally of said chamber and having a follower magnet associated therewith, in which said magnets are arranged to move in concentric annular paths around the common longitudinal axis of said shafts, and in which said magnets have adjacent poles of the same polarity with the individual polar axes of the magnets extending perpendicular to the common longitudinal axis of said shafts and with said follower magnet being positioned with respect to said driver magnet so as to produce repulsion forces therebetween, such that for zero fluid flow said magnets are disposed in an equilibrium position with a maximum angular distance between their poles and with the repulsion force at a minimum, whereas when a finite fluid flow causes rotation of said measuring mechanism shaft and driver magnet this rotation is transmitted to said follower magnet and the relative angular distance between the magnet poles decreases with increasing torque.

References Cited by the Examiner
UNITED STATES PATENTS

| | | | |
|---|---|---|---|
| 2,241,983 | 5/1941 | Connolly | 310—104 |
| 2,243,555 | 5/1941 | Faus | 310—103 |
| 2,436,939 | 9/1948 | Schug | 310—103 |
| 2,722,617 | 11/1955 | Cluwen | 310—103 |
| 2,757,364 | 7/1956 | Hood | 310—104 X |
| 3,158,025 | 11/1964 | Colatrella | 310—104 X |
| 3,163,041 | 12/1964 | Karlby | 310—104 X |

MILTON O. HIRSHFIELD, *Primary Examiner.*

D. X. SLINEY, *Assistant Examiner.*